July 5, 1955  M. D. WELSH  2,712,451
FOOT BOARD FOR STROLLER
Filed June 7, 1950

INVENTOR.
MATILDA D. WELSH
BY
ATTORNEY

2,712,451

FOOT BOARD FOR STROLLER

Matilda D. Welsh, Ladue, Mo.

Application June 7, 1950, Serial No. 166,605

1 Claim. (Cl. 280—47.4)

This invention pertains to the type of baby carriages known as strollers, and more particularly to a structure for a foot board for such a vehicle.

It has been found that in some types of strollers having a foot board rigidly mounted on the frame, which foot board usually extends forward from the front axle as these vehicles have an extremely short wheel base, a child riding in the vehicle may attempt to stand up on the foot board in which case the child's weight overbalances that of the stroller which turns over and the child gets a fall.

In accordance with this invention, the foot board of the stroller is supported on end brackets which are pivoted on the stroller frame at a point in rear of the front axle, so when the child stands up on the foot board the latter will swing toward the rear on its pivots to a position such that the weight of the child is applied in rear of the front axle so as to keep the vehicle in its proper position.

A preferred embodiment of this invention is illustrated in the accompanying drawing, in which Fig. 1 is a perspective view of a stroller having a foot board embodying this invention;

Figure 1:
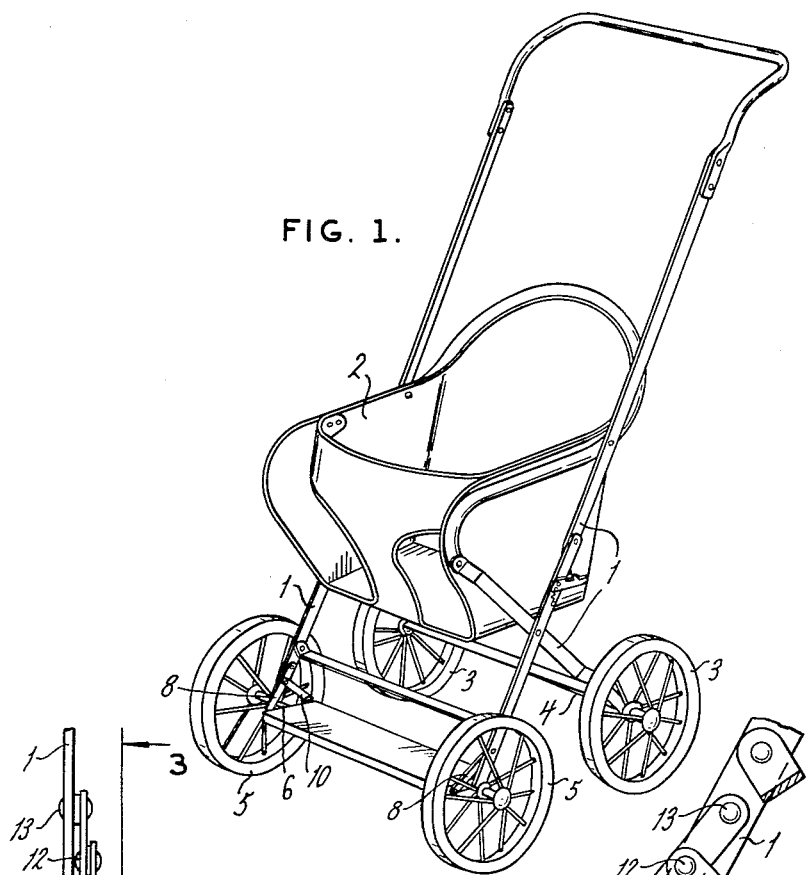
Figure 2:
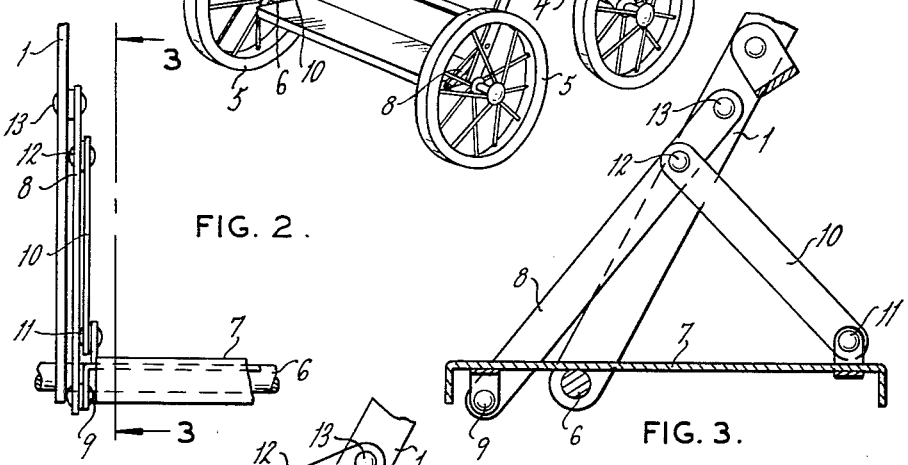
Fig. 2 is an enlarged detail of one end suspension of the foot board.

In the accompanying drawing, Fig. 1 shows one type of stroller comprising a frame 1 which may be collapsible and on which is suspended a child's seat 2 of any suitable design. The vehicle is supported on rear wheels 3 on a rear axle 4 and front wheels 5 on a front axle 6. Said front axle may extend between a pair of side members of the frame 1 as shown in Fig. 1.

Figure 3:
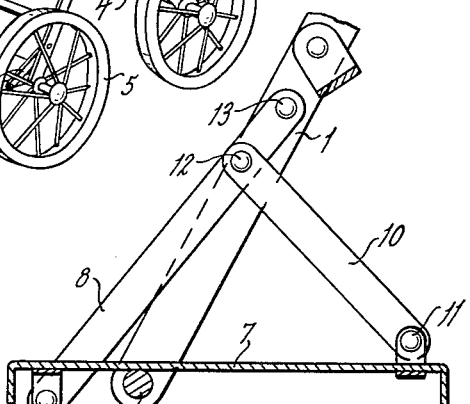
Fig. 3 is a section on line 3—3 of Fig. 2.
Figure 4:
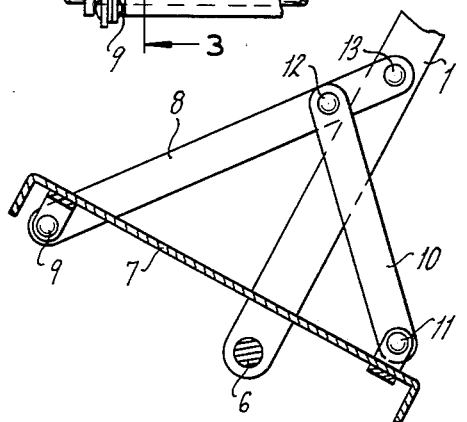
Fig. 4 is a section similar to Fig. 3 but showing the foot board swinging forward on its pivots.

The foot board 7, which may be of sheet metal as shown, is supported on a pair of end brackets, each comprising a front member 8 attached to the foot board at 9 and a rear member 10 attached to the foot board at 11. The members 8 and 10 are connected together by rivets or other fastener 12 so as to form in effect a triangular bracket as shown in Figs. 3 and 4. Each of these end brackets is mounted on one of the side members of the frame 1 by a pivot 13. This provides a swinging suspension for the foot board 7 above the axle 6.

As shown in Fig. 4, the child may kick the foot board 7 forward to the position shown in that figure or other adjacent position, which will provide a comfortable footrest corresponding to his position in the seat 2. If, however, a child should attempt to stand up on the foot board the latter will swing to the rear on the pivots 13 under the child's weight until it comes to rest against the axle 6, as shown in Fig. 3. In this position the middle of the foot board is well to the rear of the axle 6 so that the child's weight which is ordinarily over the middle portion of the foot board will also be applied to the rear of said axle. The foot board 7 is dimensioned so as not to extend forward beyond the axle 6 more than about two inches. It has been found that with such an arrangement it is practically impossible to capsize the vehicle by an attempt of the child to stand up on the foot board.

As clearly shown in Fig. 3, the footboard 7 is related to the bracket pivots 13 so that such pivots are located above the center or middle one-third of the fore-and-aft width of the footboard. It is also clear that the perpendicular distance from the pivots 13 to the footboard 7 is less than the distance of such pivots from the front axle 6 and that the distance from such pivots to the front edge of the footboard is greater than the distance from the pivots to the front axle. By such construction, the footboard may swing ferely under forward foot movement by the child. But, the rearward movement thereof will be arrested by engagement of the footboard with the axle, as shown in Fig. 3.

Various changes may be made in the details of construction, within the scope of the appended claim, without departing from the spirit of this invention. Parts of the invention may be used without the whole and improvements may be added while retaining some or all of the advantages of the invention.

I claim:

In a stroller of the character described having a scissors-bar frame pivoted above and carrying front and rear transverse axles, a pair of wheels on said axles respectively, a seat facing forward on said frame, the improvement comprising: a transverse footboard, brackets on said footboard connected by pivots to said frame forward of and below the pivotal point of said scissor-bar and above and rearward of said front axle, said bracket pivots being located above the middle one-third of the fore-and-aft width of the footboard and the perpendicular distance from said pivots to the footboard being less than the distance of said pivots from said front axle and the distance from said pivots to the front edge of the footboard being greater than said distance from the pivots to the front axle, whereby the footboard may swing freely forward under forward foot movement by the child while its rearward swing is arrested by engagement of the forward part of the footboard with the axle.

References Cited in the file of this patent

UNITED STATES PATENTS

| 882,902 | Loshbough | Mar. 24, 1908 |
| 968,170 | Lloyd | Aug. 23, 1910 |
| 1,484,419 | Stirling | Feb. 19, 1924 |
| 2,223,960 | Marchant | Dec. 3, 1940 |

FOREIGN PATENTS

| 255,855 | Switzerland | Feb. 1, 1949 |
| 602,766 | Great Britain | June 2, 1948 |